Sept. 2, 1969  KEN NAKAMURA ET AL  3,464,680
HEATING APPARATUS FOR SHEET-LIKE MATERIAL
Filed Dec. 27, 1967  2 Sheets-Sheet 1
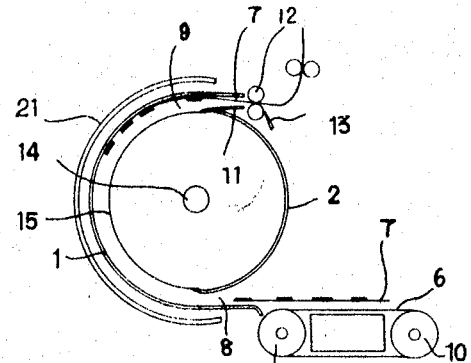
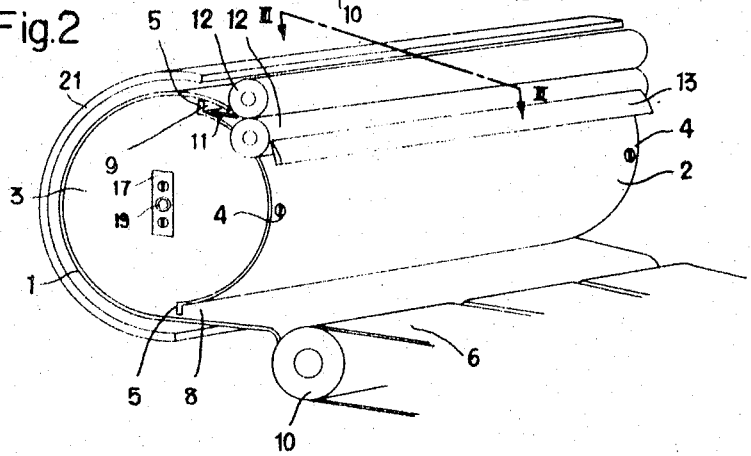
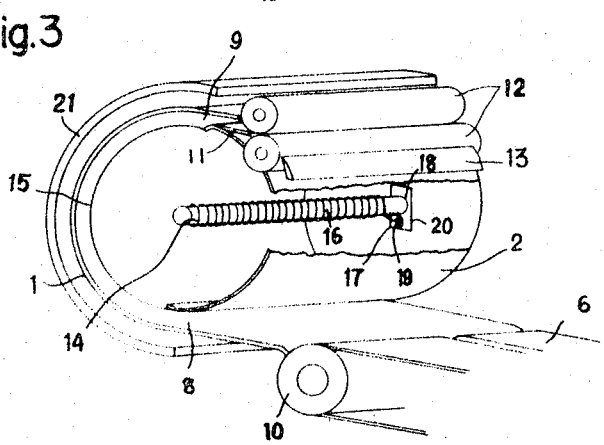
NAKAMURA, SHIBATA + SHIMAZU
by
Berman + Berman Sept. 2, 1969  KEN NAKAMURA ET AL  3,464,680

HEATING APPARATUS FOR SHEET-LIKE MATERIAL

Filed Dec. 27, 1967  2 Sheets-Sheet 2

NAKAMURA, SHIBATA + SHIMAZU by
Bierman + Bierman

United States Patent Office 3,464,680
Patented Sept. 2, 1969

3,464,680
HEATING APPARATUS FOR SHEET-LIKE
MATERIAL
Ken Nakamura, Toshio Shibata, and Yasuyuki Shimazu, Tokyo, Japan, assignors to Konishiroku Photo Industry Co., Ltd., a corporation
Filed Dec. 27, 1967, Ser. No. 693,915
Claims priority, application Japan, Dec. 30, 1966, 41/85,882
Int. Cl. F27b 9/28
U.S. Cl. 263—3      16 Claims

ABSTRACT OF THE DISCLOSURE

An apparatus for heating a sheet material comprises a guide member, a heat reflecting member, a heating source, and means for keeping the material as it moves through the apparatus spaced above a predetermined distance from the heat source. The guide member has a smooth, curved surface formed of heat conductive material. The heat reflecting member is arranged in spaced and opposing relationship with respect to the curved surface of the guide member. Peripheral ends of the curved surface of the guide member are closely spaced apart from corresponding ends of the heat reflecting member to define air gaps therebetween. The air gaps constitute an inlet and an outlet opening for the material, respectively. The heat source is disposed between the curved surface of the guide member and heat reflecting member. The curved surface of the guide member is concave with respect to the heat source. The material is introduced through the inlet opening, moved along the concave surface in contact therewith by the resilience of the material while being subject to heat from the heat source, and delivered at the outlet opening.

---

The invention relates to a heating apparatus for sheet-like material, and more particularly, though not exclusively, to such apparatus used for thermal fixing of toner images produced on such material by an electrophotographic copying machine and for thermal development of diazo reproduction.

Heretofore, heating apparatus for a sheet-like material, particularly in the electrophotography, comprised a heat source arranged over a conveyor belt on which was carried the material having an image to be fixed, or comprised a heat source disposed in the interior of a rotating drum on the peripheral surface of which was attached a sheet-like material to be heated. The former arrangement principally involves heat radiation, while the latter fixation relies upon heat conduction from the drum to the material. Both of these arrangements have low heat efficiency and require complex and large-sized construction.

Therefore, it is an object of the invention to overcome above disadvantages.

According to the invention, there is provided an apparatus for heating a sheet-like material comprising a guide member having a curved surface formed of heat conductive material, a heat reflecting member arranged to oppose the curved surface, peripheral ends of said curved surface being closely spaced apart from corresponding ends of the heat reflecting member to define air gaps therebetween which constitute an inlet and an outlet opening for the material, respectively, and a heat source disposed between the curved surface and the heat reflecting member, whereby said material is introduced through the inlet opening, moved along the curved surface in contact therewith by the resilience of the material while being subject to heat from the heat source, and delivered at the outlet opening.

In a preferred embodiment of the invention, the guide member and the heat reflecting plate are closed at their both axial ends by a pair of end plates to form a generally box-shaped enclosure within which an elongated heat source is confined. The length of path of movement of the sheet-like material along the curved surface is designed to be less than the length of the material to be passed through the heating apparatus so that the movement of the sheet material is effected by means of a conveyor belt and feed rollers arranged externally of the apparatus at the inlet and the outlet, respectively.

Preferably another guide member in the form of several spaced, parallel wires is provided in juxtaposition with or to extend parallel to the above mentioned guide member to positively keep the sheet material spaced from the heat source. Alternatively, several rollers may be positioned adjacent adjacent axial ends of the curved surface to engage both sides of the sheet material as it advances through the apparatus, thereby preventing it from contact with the heat source. Such rollers can be conveniently supported by the end plates.

The above and other objects, features and advantages of the invention will become apparent from the following description of the embodiments thereof shown in the drawing, wherein:

FIG. 1 is a cross section of a heating apparatus according to the invention,

FIG. 2 is a perspective view of the apparatus shown in FIG. 1,

FIG. 3 is a similar perspective view, partly broken away, of the apparatus which is cut along the line III—III in FIG. 2 to show the interior thereof.

Figure 4:
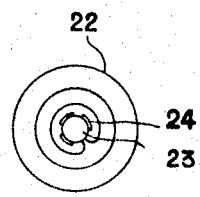
FIG. 4 is an end view of a guide roller.

Referring first to FIGS. 1 to 3, inclusively, the heating apparatus shown comprises a generally cylindrical enclosure formed by a guide plate 1 of semicircular profile and a heat reflecting plate 2 which has a similar profile of slightly reduced diameter and is arranged to oppose the guide plate 1. Preferably, these plates are made from aluminium or its alloys. Both axial ends of the plates 1 and 2 are closed by end plates 3, which serve to secure the plates 1 and 2 together as by set screws 4. As will be noted in FIG. 2, the end plate 3 has two semicircular parts, of which diameters correspond to those of the plate 1 and 2, respectively, and steps 5 are formed between the parts. The upper and lower peripheral ends of the guide plate 1 extend to some length beyond the steps 5, the lower end extending horizontally and terminating in a downward bent at a position adjacent to one end of a conveyor belt 6 for transferring a sheet-like material 7 therefrom. Between adjacent peripheral ends of the plates 1 and 2 are formed along their length an inlet and an outlet opening 8, 9, respectively, which have a height corresponding to the length of the step 5. The conveyor belt 6 is driven by suitable means such as drive rollers 10 to carry the sheet material having a toner image formed thereon to the inlet opening 8. In FIG. 1, such toner image is represented by thick, interrupted lines on the material.

Attached to the upper end of the heat reflecting plate 2 is an inclination plate 11 which extends the whole length of the plate 2 and which is raised upwardly at its outer end so that the sheet material 7 leaving the guide plate 1 may be guided thereby to pass between a pair of feed rollers 12, which are arranged outside the enclosure at a position adjacent to the free ends of the plates 1 and 11. A scraper 13 is positioned to contact the surface of the lower feed roller 12 in order to remove any deposit thereon such as zinc oxide used as a light sensitive material for the electrophotographic process or other developing agents. This provides reliable operation of the feed rollers 12 by ensuring that they never stick to each other and that an accumulation of deposits thereon cannot occur which may increase the effective radius appreciably.

As will be readily understood, the guide plate 1 defines an arcuate path of movement of the sheet material 7, and when it is carried by the conveyor belt 6 into the inlet opening 8, the material 7 continues to move along the guide plate 1 by virtue of its resilience. As mentioned previously, the length of the arcuate path between the inlet and outlet openings 8, 9 is designed to be less than the length of the sheet material 7, and the arrangement is such that initially the material 7 is pushed forward by the conveyor belt 6, but that towards the ends of its travel, it is moved by pulling action of the feed rollers 12. In practice, usual paper sheet material designed for copying purpose has long grain fibres lengthwise and when such sheet material is passed through the apparatus with its wire side inside, that is, remote from the guide plate 1, it was found that the sheet material smoothly moved along the semicylindrical guide plate 1 while being kept in contact therewith. However, in order to provide application versatility of the apparatus by ensuring that the trailing end of any sheet material may fall clear of the guide plate 1 without contacting a neat source 14 disposed nearly at the center of the enclosure, several, axially spaced wires 15 are provided to extend parallel to the guide plate 1, the wires 15 being joined at their both ends with the peripheral ends of the heat reflecting plate 2. In a modification, these wires may be replaced by several rings which are connected together by axially extending rods to form a cage structure and the latter may be rotated at the same peripheral speed as the feed rate of the sheet material. This minimizes the rubbing action upon the sheet material.

As best shown in FIG. 3, the heat source 14 comprises a coil of electrical resistance wire supported by a quartz tube 16. To support the quartz tube 16, the end plates 3 have electrically insulating boards 17 mounted thereon which include an annular groove 18 to receive the end of the quartz tube 16. A terminal in the form of a bolt 19 is fixed to the board, and each end of the heater coil 14 is connected to the terminal on both end plates 3. The end plate 3 has a rectangular opening 20 to expose the groove 18 and terminal 19. In addition, the apparatus includes a heat insulating plate 21 of semicircular cross section to prevent or suppress heat radiation to the exterior from the guide plate 1.

The operation of the apparatus will be apparent from the foregoing description. Thus a sheet-like material 7 having a toner image is fed into the inlet opening 8 of the apparatus from a developing station of an electrophotographic copying machine, for example, through the conveyor belt 6. During its movement through the apparatus, the material 7 is positioned with its toner image inside, that is, facing the heater coil 14. Due to its resilience, the material 7 moves along the guide plate 1, generally in contact therewith. As the leading edge of the sheet material approaches the outlet opening 9, it moves over or on the inclination plate 11 to be caught by the pair of feed rollers 12, the passage between the feed rollers 12 being positioned slightly below the level of the upper end of the guide plate 1. When the trailing end of the sheet material 7 tends to leave the guide plate 1 and to fall, the wires 15 provide necessary support therefor and also serve to guide the material 7. It will be appreciated that heat is imparted to the material 7 by conduction from the guide plate 1, which is heated by heat radiated from the heater coil 14 and by heat reflected from the heat reflecting plate 2. Also it will be appreciated that radiation from the heat source 14 and heat of reflection from the plate 2 are directly applied to the material 7. The passage of the sheet material 7 along an arcuate path around the heat source provides a sufficient time of its exposure to heat, and this together with the arrangement of transmitting heat through conduction, radiation, convection and reflection as well as minimum heat loss afforded by the enclosure 1, 2 and 3 achieves a high heating efficiency. As a result, the power capacity of the heat source may be reduced or the time required for the fixation may be considerably decreased than in the prior art.

As a further advnatage of the invention, the drive for the sheet-like material is provided outside the heating apparatus proper, so that there is no need to use special materials for the drive components, which would otherwise be required to compensate for their temperature rise. Consequently, the drive components have long operative life. The provision of the scraper 13 ensures a smooth feeding operation by the rollers 12.

In addition, because heat transmitting areas are provided stationarily, a temperature sensing unit such as bimetallic unit or thermistor can be mounted on the rear or outer surface of the guide plate 1, for example, to sense its temperature directly. This substantially facilitates temperature control of the apparatus. Although the embodiment shown employs a single heater coil, three such or similar heater units may be provided in the enclosure, one unit being energized only when the apparatus is initially turned on to provide a rapid temperature rise together with another unit that is powered continuously during use, and the third unit being controlled by the temperature sensing unit. According to the arrangement of the invention, time lag in sensing temperature is minimized and the temperature to which the sheet material is heated can be maintained within a very narrow limit. Furthermore, the heater unit shown may be replaced by any other kind of heater unit, including one as shown and described in a pending application U.S. Ser. No. 685,824, filed Nov. 27, 1967.

Figure 5:
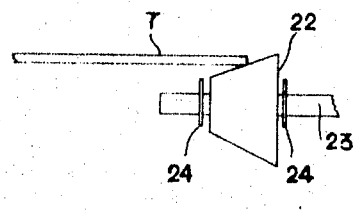
FIG. 5 is a side elevation of the guide roller shown in FIG. 4 cooperating with a sheet material.
Figure 6:
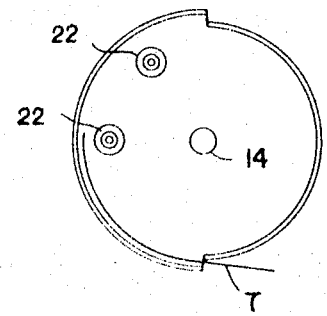
FIG. 6 shows an arrangement of several guide rollers within the apparatus.

FIGS. 4 to 6 show guide rollers 22 which may be used in place of or together with the wires 15. Each guide roller 22 is rotatably supported on its axle 23 and is held against axial movement by a pair of clamp rings 24 which engage annular grooves formed in the axle. The axles 23 are secured to the end plates 3. As shown in FIG. 5, the guide roller 22 is frustoconical in shape, and is positioned to engage either side edge of the sheet material 7 to prevent its lateral displacement and contamination of image area. Several such guide rollers 22 are provided on each end plate 3 as shown in FIG. 6, where it will be noted that the guide rollers 22 are spaced at a small distance from the guide plate 1 and are located along the upper half thereof.

The number of such guide rollers on one side of the guide plate 1 is suitably selected so that the sheet material does not fall inside such guide rollers 22. The correct position of these guide rollers at the opposite axial ends of the enclosure is not critical. Thus their axles 23 need not be aligned, but may be staggered. Although the sheet material 7 is engaged by the guide rollers 22 only at its side edges, this does not cause its middle part to bulge inwardly because of the shape of the path which it follows in the apparatus, that is, generally concave configuration, and physical properties of the material. In fact, a very thin paper proved to operate satisfactorily. Such guide rollers can be incorporated into the apparatus to obtain stable fixation without in any way disturbing the image.

Although the invention has been described with reference to particular embodiments shown in the drawing, it should be obvious that various modifications can be made within the scope of the invention. Thus the guide plate 1 need not be semicircular, but may be designed to have any other suitable concave surface. In particular, the heat reflecting plate 2 may be a flat plate. Also the guide roller 22 shown in FIGS. 4 to 6 may be a plain cylindrical roller with or without channel members on both sides of the guide plate 1. Such channel member can be formed by a strip secured vertically or inclined to the end plate 3 and extending parallel to the guide plate 1. It will be appreciated that the apparatus according to the invention can be applied not only in fixation of the electrophotographic process or thermal developing of diazo type reproduction process, but also for thermally drying a sheet-like material in a liquid developing process of the electrophotography.

What we claim is:

1. An apparatus for heating a sheet-like material comprising a guide member having a curved surface formed of heat conductive material; a heat reflecting member arranged to directly oppose the curved surface, without any interposition of other materials, peripheral ends of said curved surface being closely spaced apart from corresponding ends of the heat reflecting member to define air gaps therebetween which constitute an inlet and an outlet opening for the sheet material, respectively; and a heat source disposed between the curved surface and the heat reflecting member, whereby said sheet material is introduced through the inlet opening, moved along the curved surface in contact therewith by the resilience of the sheet material while being subject to direct heat from the heat source, and delivered at the outlet opening.

2. An apparatus according to claim 1, wherein both said guide member and said heat reflecting member are of a semicircular shape in section.

3. An apparatus according to claim 1, further comprising a conveyor belt arranged adjacent to said inlet opening, a pair of feed rollers defining therebetween a passageway through which the material leaving the outlet opening is delivered, and a guide plate arranged between said outlet opening and said passageway to serve as a guide for the leading edge of the material to direct it into the passageway.

4. An apparatus according to claim 3 wherein a scraper blade is disposed in contact with one of the feed rollers for removing any deposit onto said one feed roller therefrom.

5. An apparatus for heating a sheet-like material comprising a guide member having a smooth, curved surface formed of heat conductive material; a heat reflecting member arranged in spaced and directly opposing relationship with respect to the curved surface, without any interposition of other materials, peripheral ends of said curved surface being closely spaced apart from corresponding ends of the heat reflecting member to define air gaps therebetween which constitute an inlet and an outlet opening for the material, respectively; a heat source disposed between the curved surface and the heat reflecting member, said curved surface being concave with respect to the heat source; and means for keeping the material, as it moves through the apparatus, spaced above a predetermined distance from the heat source, whereby said material is introduced through the inlet opening, moved along the concave surface in contact therewith by the resilience of the material while being subject to direct heat from the heat source, and delivered at the outlet opening.

6. An apparatus according to claim 5, wherein both said guide member and said heat reflecting member are of a semicircular shape in section.

7. An apparatus according to claim 5 wherein said curved surface and said heat reflecting member are concave towards each other and are secured together by a pair of end plates, thereby forming a generally cylindrical enclosure in which said heat source is confined, said openings being slit-like in shape extending along the length of the enclosure.

8. An apparatus according to claim 5 wherein said means is constituted by several wires spaced from an coextensive with the heat conductive concave surface.

9. An apparatus according to claim 5 wherein said means is constituted by a few number of freely rotatable guide rollers arranged at a distance from the concave surface and positioned to engage opposite side edges of the material as it is moved along the concave surface.

10. An apparatus according to claim 9 wherein said guide rollers are frustoconical in shape, with their outer parts of larger diameter engaging with side edges of the sheet material to thereby hold the material against lateral displacement and prevent contamination of image area.

11. An apparatus for heating a sheet-like material comprising a guide member having a smooth, curved surface formed of heat conductive material; a heat reflecting member arranged in spaced and opposing relationship with respect to the curved surface, said curved surface and said heat reflecting member being concave towards each other and being secured together by a pair of end plates, thereby forming a generally cylindrical enclosure in which said heat source is confined, said openings being slit-like in shape extending along the length of the enclosure, peripheral ends of said curved surface being closely spaced apart from corresponding ends of the heat reflecting member to define air gaps therebetween which constitute an inlet and an outlet opening for the material, respectively; a heat source disposed between the curved surface and the heat reflecting member, said curved surface being concave with respect to the heat source; and means for keeping the material, as it moves through the apparatus, spaced above a predetermined distance from the heat source, whereby said material is introduced through the inlet opening, moved along the concave surface in contact therewith by the resilience of the material while being subject to heat from the heat source, and delivered at the outlet opening.

12. An apparatus for heating a sheet-like material comprising a guide member having a smooth, curved surface formed of heat conductive material; a heat reflecting member arranged in spaced and opposing relationship with respect to the curved surface, peripheral ends of said curved surface being closely spaced apart from corresponding ends of the heat reflecting member to define air gaps therebetween which constitute an inlet and an outlet opening for the material, respectively; a heat source disposed between the curved surface and the heat reflecting member, said curved surface being concave with respect to the heat source; and several wires spaced from and coextensive with the heat conductive concave surface, for keeping the material, as it moves through the apparatus, spaced above a predetermined distance from the heat source, whereby said material is introduced through the inlet opening, moved along the concave surface in contact therewith by the resilience of the material while being subject to heat from the heat source, and delivered at the outlet opening.

13. An apparatus for heating a sheet-like material comprising a guide member having a smooth, curved surface formed of heat conductive material; a heat reflecting member arranged in spaced and opposing relationship with respect to the curved surface, peripheral ends of said curved surface being closely spaced apart from corresponding ends of the heat reflecting member to define air gaps therebetween which constitute an inlet and an outlet opening for the material, respectively; a heat source disposed between the curved surface and the heat reflecting member, said curved surface being concave with respect to the heat source; and a few freely rotatable guide rollers, arranged at a distance from the concave surface and positioned to engage opposite side edges of the material as it is moved along the concave surface, for keeping the material, as it moves through the apparatus, spaced above a predetermined distance from the heat source, whereby said material is introduced through the inlet opening, moved along the concave surface in contact therewith by the resilience of the material while being subject to heat from the heat source, and delivered at the outlet opening.

14. An apparatus according to claim 13, wherein said guide rollers are frustoconical in shape, with their outer parts of larger diameter engaging with side edges of the sheet material to thereby hold the material against lateral displacement and prevent contamination of image area.

15. An apparatus for heating a sheet-like material comprising a guide member having a curved surface formed of heat conductive material; a heat reflecting member arranged to oppose the curved surface, peripheral ends of said curved surface being closely spaced apart from corresponding ends of the heat reflecting member to define air gaps therebetween which constitute an inlet and an outlet opening for the sheet material, respectively; a conveyor belt arranged adjacent to said inlet opening; a pair of feed rollers defining therebetween a passageway through which the material leaving the outlet opening is delivered; a guide plate arranged between said outlet opening and said passageway to serve as a guide for the leading edge of the material to direct it into the passageway; and a heat source disposed between the curved surface and the heat reflecting member, whereby said sheet material is introduced through the inlet opening, moved along the curved surface in contact therewith by the resilience of the sheet material while being subject to heat from the heat source, and delivered at the outlet opening.

16. An apparatus according to claim 15, wherein a scraper blade is disposed in contact with one of the feed rollers for removing any deposit onto said one feed roller therefrom.

References Cited
UNITED STATES PATENTS 3,371,915    3/1968    Kawamura et al. __ 219—216 X JOHN J. CAMBY, Primary Examiner U.S. Cl. X.R.

263—6; 219—216